United States Patent [19]

Von Meer

[11] Patent Number: 4,675,245

[45] Date of Patent: Jun. 23, 1987

[54] PHOTOGRAPHIC PAPER SUPPORT

[75] Inventor: Walter P. M. Von Meer, Bad Iburg, Fed. Rep. of Germany

[73] Assignee: Felix Schoeller Jr. GmbH & Co., KG, Burg Gretesch, Fed. Rep. of Germany

[21] Appl. No.: 622,207

[22] Filed: Jun. 19, 1984

[30] Foreign Application Priority Data

Aug. 6, 1983 [DE] Fed. Rep. of Germany ....... 3328463

[51] Int. Cl.[4] ........................ B32B 5/16; B32B 27/10; G03C 1/78

[52] U.S. Cl. .................................... 428/328; 428/330; 428/513; 428/534; 428/537.7; 428/537.5; 427/411; 427/415; 430/536; 430/538

[58] Field of Search ............... 428/533, 513, 328, 534, 428/330, 537.7; 427/411, 415; 430/536, 538

[56] References Cited

U.S. PATENT DOCUMENTS

| | | | |
|---|---|---|---|
| 2,697,040 | 12/1954 | Parnell | 430/538 |
| 4,267,267 | 5/1981 | Ikenoue et al. | 430/538 X |
| 4,288,287 | 9/1981 | Miyama et al. | 428/513 X |
| 4,326,532 | 4/1982 | Hammar | 428/411 X |
| 4,396,671 | 8/1983 | Wanka et al. | 428/513 X |
| 4,433,030 | 2/1984 | Tamagawa et al. | 428/513 X |
| 4,447,524 | 5/1984 | Uno et al. | 428/513 X |

*Primary Examiner*—P. C. Ives

*Attorney, Agent, or Firm*—Lockwood, Alex, Fitzgibbon & Cummings

[57] ABSTRACT

A photographic paper support made of a water-repellent sized base paper coated on both sides with a waterproof synthetic resin, and wherein the paper contains a combination of sizing substances including a water-repellent sizing agent, a cationic strengthening retention and binding agent and a sulfate or phosphate ester of a polysaccharide. The water-repellent sizing agent relative to the paper fiber content is about 0.2 to 2% by weight, the cationic strengthening and binding agent is greater in amount than about 1.5 of the water-repellent sizing agent, and the amount of the esterified polysaccharide is about 0.1 to 10% by weight relative to the fiber content.

19 Claims, No Drawings

PHOTOGRAPHIC PAPER SUPPORT

The invention concerns paper supports coated with waterproof synthetic resins for photographic films. It especially concerns coated paper supports for such photographic films as require wet development or wet fixation of the photographic image using photographic baths and whose paper core is protected by the resin layers against the action of the treatment fluids.

Paper supports for photographic films coated on both sides with waterproof resin layers are known in different variations. U.S. Pat. Nos. 1,944,824, 2,698,235 and 2,776,236 describe support papers coated on both sides with dissolved polyvinyl resins. In CA No. 476 691, photographic baryte papers are coated on both sides with cellulose acetate butyrate. DP 912-273 describes for the first time a paper support that is coated with pigment-containing paint and varnish resin layers, and in DAS 1 188 436 the use of paper with polyalkylene coating as a photographic support is mentioned for the first time. Since then, papers coated on both sides with polyolefin resin have been widely adopted as photographic supports and are described in numerous patents (U.S. Pat. Nos. 3,161,519, 3,253,922, BE No. 626 722, FR No. 1 353 771, U.S. Pat. Nos. 3,411,908, 3,501,298, 3,833,380 and others). The most recent development is that of papers that, according to DOS No. 3 022 451 or DOS No. 3 022 709, disclose support coatings hardened with electron beams.

The paper supports coated on both sides with resin are in principle protected on both surfaces against the action of the usual photographic processing fluids. Only at the edge of the coated papers is this protection interrupted, and the fluids have access to the core there. Due to the natural absorptive capacity of paper, these fluids enter the edges and pass into the paper core and cannot be completely removed even with repeated soakings in water. Since the fluids frequently contain substances that darken in contact with the air or under light, photographic processing fluids that have penetrated soon show up as dark discolored edges.

This attendant problem of a limited sealing on the two sides of the photographic support papers has long been recognized and is described in DOS No. 1 546 355. Even the usual sizing of the papers, e.g. with resin or stearate soap, is not enough to prevent the lateral penetration of the baths, because these sizings are damaged by the high pH values of 10 to 11 of a photographic developing solution. Only through combined use of a cationic hardening resin with a water-repellent sizing agent in the proportion of 2:1 or greater was it possible to reduce the penetration of the photographic baths into the unprotected edges to the order of a few tenths of a millimeter. Such a special sizing was described for the first time in Example 1 of DOS No. 2 344 367.

Water-repellent sizing agents that are suitable in the mentioned sizing agent combination are not only the known higher fatty acids in the form of their salts or anhydrides, e.g., stearic acid or alkyl succinic acid, but also dimeric alkyl or alkylarylketenes, as described in greater detail, e.g., in U.S. Pat. No. 2,865,743. But even epoxidized aliphatic amines as described in DOS No. 2 755 197 or mixtures of different water-repellent sizing agents are used.

Best known cationic strengthening are epoxidized polyamide or polyamine resins (U.S. Pat. Nos. 2,926,116, 3,629,092, 3,968,317, 3,990,939). Also cationic polysaccharide derivates (DAS No. 2 312 498), cationic polyacrylamides (U.S. Pat. No. 4,135,969) or even amphoteric resins (U.S. Pat. No. 4,002,588) can be used to bind the necessary water-repellent sizing agents to cellulose to protect them against the affects of alkali.

The desire for shorter and shorter processing times for photographs, however, led to the introduction of more and more strongly and quickly penetrating processing fluids. In particular, the addition of benzyl alcohol to the developer for color pictures has been generally adopted and this has again led to an intensified penetration of developer into the unprotected paper edges.

Numerous special attempts were made to decrease the penetration of the alcohol containing fluids. Japanese patent application No. 54-147211 describes a sizing method according to which, by combining two water-repellent sizing agents with cationic resin and polyacrylamide, the penetration of the developer is reduced. Japanese patent application No. 56-109343 uses for the same purpose an addition of 0.01 to 0.09% of an organofluorine as is customary in textile treatment. Japanese patent applications Nos. 52-63410 and 56-14235 use an addition of carboxyl-modified polyvinyl alcohol together with water-repellent fatty acids and retentioning aids, such as aluminum sulfate or the like, and DOS No. 3 210 621 uses a combination of water-repellent sizing agent with anionic polyacrylamide and cationic starch to decrease the penetration of photographic developers into the paper core.

None of the cited solutions is fully satisfactory, however. A specific drawback of the sizing variants mentioned in JOS No. 54-147211, JOS No. 56-109343, JOS No. 52-63410, JOS No. 56-14235 and DOS No. 3 210 621 is their great dependence on the hardness of the water used for the production of the paper. With water of slight hardness or water that has been desalinated, the penetration of the photographic developer is about as low as given in the descriptions. But if water of a greater degree of hardness is used, then the sizing effect is patently reduced and the depth of penetration for modern color developers increases up to a little under 1 mm.

The significance of a paper sizing that is dependent in its effect on the water hardness is very obvious. On the one hand, the desalination of hard water is expensive and energy-consuming and, on the other hand, even the slight hardness of naturally soft low salt water is enough in a closed water cycle in a papermaking machine to lead to a salt enrichment in a short time. The natural result is that, even after a few hours of operating time of a papermaking machine, changes appear in the colloid chemistry system and the depth of penetration of the photographic developer into the paper fabric increases noticeably.

It is therefore the objective of the present invention to create a waterproof coated paper that has a decreased penetration of alcohol-containing photographic developing fluids on the unprotected edges of the paper, with the sizing effect being independent of the degree of hardness of the water used for the production of paper.

This objective is achieved as follows: The base paper used for the two-sided coating with waterproof resin is provided internally in a specific manner with a combination of sizing materials. The sizing material combination of the invention is added to the fibrous slurry in the usual manner before the sheet formation, the sequence being variable. The sizing combination comprises:

(a) a water-repellent sizing agent or a mixture of different water-repellent sizing agents, (b) a cationic strengthening agent that acts as a retention agent for the water-repellent sizing agent and is present in an amount that is greater than the amount of the water-repellent sizing agent, and (c) a sulfate ester or a phosphate ester of a polysaccharide.

Alkyl ketene dimers, alkyl aryl ketene dimers, anhydrides of higher fatty acids, epoxidized aliphatic amines, long-chain epoxy alkyl compounds, long-chain isopropenyl esters or even mixtures from these substance groups proved to be suitable water-repellent sizing agents for a sizing material combination as specified for the invention. Water-repellent sizing agents are usually added to the fibrous slurry in the form of suspensions or emulsions and are absorbed directly on the fibers or are made to be absorbed by the cellulose fibers with the aid of suitable and known additives. The amount added of water-repellent sizing agent is about 0.2 to 2% by weight with reference to the proportion of paper fibers.

Suitable cationic strengthening agents are, for example, different cationized starches, carbamoyl ethyl starch, cationized guaran or carubin, cationic polyacrylamides, e.g., copolymers of acrylamide and dimethyl diallyl ammonium chloride and its reaction products with epicholorhydrin resins, polyamine-polyamide epichlorohydrin resins, cationic dextran graft copolymers, e.g., as per U.S. Pat. No. 3,734,820, or cationically modified polyvinyl alcohols, e.g., as per U.S. Pat. No. 3,410,828. Other suitable cationic strengthening are described in *Cellulose Chemistry and Technology,* Vol. 15, 1981, pages 247 to 263. In principle, several of these strengthening agents can also be used simultaneously.

The amount of cationic strengthening agent added is, with reference to the proportion of paper fiber, always greater than the amount of water-repellent sizing agent and is preferably more than 1.5 times the water-repellent sizing agent.

Soluble phosphate esters of starches, guaran, carubin, dextran, cellulose, chitosan or similar polysaccharides are advantageously used as phosphate or sulfate esters called for by the invention. Esters with relatively low degree of substitution of 0.05 to 0.5 can be used in acid form or as ammonium salts. Higher substituted products are likewise suitable, but are conveniently used as sodium salts. The same is true in general also for sulfuric acid esters. The use of the known sodium salts of cellulose sulfate is one of various possibilities. Also, the use of carrageenan, a natural sulfuric acid ester of a polysaccharide, or of starch sulfate is possible.

In a special form of execution, water-unsoluble cellulose fibers partially esterified with sulfuric acid or phosphoric acid can be used.

The water soluble sulfuric or phosphoric acid esters of polysaccharides are added in amount of 0.1 to 5% by weight with refrence to the fiber proportion of the paper pulp. Fiber-shaped partial esterified celluloses which are generally not water soluble are used in quantities of 0.5 to 10% by weight with reference to the total fiber content of the paper pulp.

The base papers of the invention are manufactured in known manner using a papermaking machine. In addition to the cellulose fibers, the paper fiber pulp can also have synthetic fibers, mineral or organic fillers, white pigment, dye or color pigment, optical brighteners, anti-oxidizing agents and/or other conventional additives in the production of photographic papers. The paper can further be surface-sized and is coated on both sides in the usual manner with synthetic resin after production and smoothing.

The synthetic resin coating can be done as extrusion coating out of the melt, as a dispersion coating, as a coating of beam-hardening mixtures or in another known manner. The paper coated with resin serves—if necessary, also after application of additional coats and after application of an adhesive-promoting pretreatment—as a support for any desired photographic films and has an excellent resistance to baths.

The invention-based production of base papers for the production of bathproof paper supports for photographic films will be explained in the following examples. The weight basis of all papers prepared according to the examples and comparison examples was about 160 g/m$^2$. Other experiments revealed, however, that the effect according to the invention is not limited to this surface unit weight, but is observed at least in the surface unit weight range of 50 g/m$^2$ to 200 g/m$^2$.

EXAMPLES 1-6

To mixtures of 50% by weight of deciduous tree wood sulfate cellulose and 50% by weight of softwood sulfite celluose which were beaten with a total fibrous material concentration of 4% by weight in water of 28° German hardness to a beating degree of about 35° SR, are added, as shown in Table 1, various quantities of starch phosphoric acid esters (DS=about 0.1). After a further brief beating and dilution to a fibrous material concentration of about 1% by weight, 0.5% by weight of alkyl ketene dimer ($C_{15}$-$C_{17}$-alkyl residues) in the form of an aqueous emulsion, 1% by weight of polyamide polyamine epichlorohydrin resin and 0.2% by weight of cationic polyacrylamide are added.

Then the different pulp slurries are processed in known manner into paper sheets with surface unit weight of 160 g/m$^2$, surface-sized with an aqueous solution containing 5% by weight of oxidized starch, 2% by weight of NaCl and 0.2% by weight of optical brightener, and are smoothed. Thereafter, the papers are coated on both sides with polyethylene mixtures and cut into 7 cm wide test strips. The test strips are then put into an automatic developing device for color papers using commerically available Kodak solutions and the depth of penetration of the processing fluids into the cut edges is determined with a measuring magnifying glass in each instance.

TABLE 1

| Example No. | Amount of starch phosphate added (wt. %) | Penetration depth of the developing solutions (mm) |
|---|---|---|
| 1 | 0.5 | 0.6 |
| 2 | 1.0 | 0.55 |
| 3 | 2.0 | 0.5 |
| 4 | 3.0 | 0.5 |
| 5 | 4.0 | 0.55 |
| 6 | 5.0 | 0.6 |

EXAMPLE 7

To an aqueous slurry of a beaten cellulose mixture, as per Example 1, were added 1% by weight of phosphatized guaran (DS=0.13), 0.3% by weight of alkyl ketene dimer ($C_{23}$-alkyl residues), 0.2% by weight of epoxidized aliphatic acid amine, 1% by weight of cationic starch, 0.3% by weight of polyamide-polyamine epichlorohydrin resin, and from this were made, as in Example 1, paper and a resin-coated photographic support. Testing using the test method described in Example 1 revealed a penetration depth of 0.45 mm for the solutions.

EXAMPLE 8

A cellulose mixture of 30% by weight of deciduous wood sulfate cellulose and 70% by weight of softwood sulfite cellulose is beaten as in Example 1, successively mixed with 0.3% by weight of sodium cellulose sulfate (DS=about 0.5), 0.6% by weight of $C_{17}$-alkyl succinic acid anhydride, 0.3% by weight of cationic guaran and 0.8% by weight of polyamide epichlorohydrin resin, each with reference to the fibrous material content, processed into paper, and the latter coated on both side with polyolefin resin. Testing with the test method described in Example 1 gave a penetration depth of 0.4 mm for the developing solutions.

EXAMPLE 9

A cellulose mixture, as in Example 8, is beaten, successively mixed with 0.8% by weight of sulfuric acid ester of chitosan, 0.4% by weight of chlorinated 4-benzyl-5-phenylpentylketene dimer, 0.2% by weight of cationic polyacrylamide and 0.7% by weight of polyamide epichlorohydrin resin, processed into paper, and the latter coated on both sides with polyolefin resin. Testing using the test method described in Example 1 gave a penetration depth of 0.5 mm for the developing solutions.

EXAMPLE 10

A cellulose mixture, as in Example 8, is beaten and successively mixed with 0.3% by weight of sodium dextran sulfate (DS=about 0.2), 0.6% by weight of $C_{15}$–$C_{17}$-alkylketene dimer, and 1.5% by weight of polyamide epichlorohydrin resin, processed into paper, and the latter coated on both sides with polyolefin. Testing using the testing method described in Example 1 gave a penetration depth of 0.5 mm for the developing solutions.

EXAMPLE 11

A cellulose mixture, as in Example 8, is beaten, successively mixed with 3% by weight of carrageenan, 0.5% by weight of $C_{15}$–$C_{17}$-alkylketene dimer, 0.5% by weight of polyamide epichlorohydrin resin, and 0.8% by weight of cationic polyacrylamide, processed into paper, and the latter coated on both sides with polyolefin resin. Testing using the testing method described in Example 1 gave a penetration depth of 0.45 mm for the developing solutions.

EXAMPLE 12

A cellulose mixture as in Example 8, is beaten, mixed successively with 2% by weight of starch phosphoric acid ester (DS=about 0.1), 0.5% by weight of $C_{15}$–$C_{17}$-alkylketene dimer, 1.2% by weight of cationic guaran and 0.3% by weight of polyamide epichlorohydrin resin, processed into paper, and the latter coated on both sides with polyolefin resin. Testing using the testing method described in Example 1 gave a penetration depth of 0.5 mm for the developing solutions.

EXAMPLE 13

A cellulose mixture, as in Example 8, is beaten, mixed successively with 0.5% by weight of polyethylene imine, 5% by weight of anatase, 0.6% by weight of $C_{15}$–$C_{17}$-alkylketene dimer, 0.5 by weight of sodium cellulose sulfate and 1% by weight of condensation product from polyvinyl alcohol, polyethylene imine and epichlorohydrin (1:2:2 as per U.S. Pat. No. 3,348,997), processed into paper, and the latter coated on both sides with polyolefin resin. Testing using the testing method described in Example 1 gave a penetration depth of 0.55 mm for the developing solutions.

EXAMPLE 14

A cellulose mixture, as in Example 8, is beaten, mixed with 20% by weight, with reference to the collulose fibers, of beaten synthetic fibrous material of polyolefin resin, then mixed successively and in proportion to the sum of the fibrous material mixture with 1% by weight of phosphatized guaran (DS=about 0.15), 0.5% by weight of $C_{21}$-alkylketene dimer, 1% by weight of polyamide epichlorohydrin resin and 0.2% by weight of cationic galactomannan, processed into paper, and the latter coated on both sides with polyolefin resin. Testing using the method described in Example 1 gave a penetration depth of 0.5 mm for the developing solutions.

EXAMPLE 15

A cellulose mixture, as in Example 8, is beaten, successively mixed with 1% by weight of sulfated starch, 1% by weight of n-decenyl succinic acid anhydride, 0.2% by weight of sodium aluminate and 2% by weight of polyamide epichlorohydrin resin, processed into paper, and the latter coated on both sides with polyolefin resin. Testing using the testing method described in Example 1 gave a penetration depth of 0.6 mm for the development solutions.

EXAMPLE 16

A cellulose mixture, as in Example 8, is beaten, mixed successively with 0.01% by weight of substantive paper blueing dye, 0.6% by weight of isopropenylbehenate, 1.5% by weight of chitosan and 0.6% by weight of phosphatized guaran, processed into paper as in Example 1, and the latter coated on both sides with polyolefin resin. Testing under the test method described in Example 1 gave a penetration depth of 0.45 mm.

EXAMPLE 17

A fibrous material mixture of 30% by weight of deciduous wood sulfate cellulose, 60% by weight of softwood sulfite cellulose and 10% by weight of a phosphated softwood sulfite cellulose (DS=about 0.05) is beaten as in Example 1, mixed with 0.6% by weight of $C_{12}$-alkylketene dimer and 1.5% by weight of polyamide epichlorohydrin resin and processed into paper. The paper is coated on both sides with polyolefin resin and tested with the testing method described in Example 1 with photographic developing solutions. A penetration depth of 0.6 mm was found for the developing solutions.

COMPARISON EXAMPLES

For control of the effect based on the invention as described in detail in Examples 1 to 17, two series of comparison papers were produced. The comparison papers differ from the papers of the examples in that in each case the amount given in the examples for phosphoric acid or sulfuric acid ester of a polysaccharide was *not* added.

The first series of the comparison papers without addition of polysaccharide derivate was processed with the same well water of 28° dH (German degrees of hardness) like the papers of Examples 1-17 (comparison series A). The second series of the comparison papers without addition of polysaccharide derivate was prepared using desalinated water with a residual hardness of 5° dH. Then in each case at the beginning of the production and after seven hours in a closed water cycle, paper samples were taken (comparison series B1 and B2). The comparison examples to the Examples 10 and 17 are identical.

The papers of both comparison series were, like the examples based on the invention, coated on both sides with polyethylene resin and tested under the method described in Example 1 with photographic developing solutions. The determined penetration depths of the developing solutions are summarized in Table 2. In order once again to make clear the advantage of the sizing material combinations of the invention, the penetration depths for the paper supports of Examples 1-17 have also been included in this table.

As a supplementary comparison corresponding to the state of the art, a comparison Example 18 was prepared according to Example 1 of DOS No. 3,210,621, coated with polyethylene and tested like the rest of the papers. The results are likewise given in Table 2.

In order to be able to determine, in addition to the penetration depths of the solutions, also the possible difference in the intensity of the discoloration of the edges, the paper support strips that have been passed through developing solutions were wound into tight rolls. The ends of these rolls thus provide a good visual comparison of the yellowing of the paper edges. This discoloration is entered in Table 2 in the "stain" column as a subjective comparison notation. The numerals have the following values:

2—slight discoloration
3—moderate discoloration
4—rather heavy discoloration
5—heavy discoloration

I claim:

1. A photographic paper support made of a water-repelling sized base paper coated on both sides with a waterproof synthetic resin, said base paper containing a combination of internal sizing substances therein including a water-repellent sizing agent, a cationic strengthening and binding agent and a sulphate or phosphate ester of a polysaccharide.

2. The photographic paper support of claim 1, wherein the amount of water-repellent sizing agent relative to the paper fiber content in the base paper is about 0.2 to 2% by weight, the amount of cationic strenghtening agent is greater than the water-repellent sizing agent, and the amount of the esterified polysaccharide is at least about 0.1% by weight relative to said fiber content.

3. The photographic paper support of claim 2, wherein the amount of cationic strengthening agent is greater than about 1.5 times the water-repellent sizing agent.

4. The photographic paper support of claim 2, wherein the amount of said esterified polysaccharide is between about 0.1 to 10% by weight relative to said fiber content.

5. The photographic paper support of claim 1, wherein said polysaccharide is selected from the group consisting essentially of starch, cellulose, guaran, carubin, dextran or chitosan.

6. The photographic paper support of claim 1, wherein the substitution degree of said polysaccharide is greater than 0.05.

7. The photographic paper support of claim 1, wherein said water-repellent sizing agent is selected from the group consisting essentially of a dimeric alkylketene, a dimeric alkylarylketene an alkyl carboxylic acid anhydride, a metallic soap of an alkyl carboxyl acid or a mixture thereof.

8. The photographic paper support of claim 1, wherein said cationic strengthening agent is a nitrogen containing polymer.

9. The photographic paper support of claim 1, wherein the surfaces of the base paper under and in the

TABLE 2

Summary of Test Results on Examples based on the Invention and Comparison Examples

| No. | Examples based on invention: Penetration depth (mm) | Examples based on invention: Stain | A Series: Penetration depth (mm) | A Series: Stain | Comparison examples without polysaccaharide ester — B1 Series measured immediately: Penetration depth (mm) | B1 Series: Stain | B2 Series measured after 7 hours: Penetration depth (mm) | B2 Series: Stain |
|---|---|---|---|---|---|---|---|---|
| 1 | 0.6 | 2 | | | | | | |
| 2 | 0.55 | 2 | | | | | | |
| 3 | 0.5 | 1-2 | | | | | | |
| 4 | 0.5 | 1-2 | 0.75 (Nos. 1-6) | 3-4 | 0.6 | 2-3 | 0.75 | 3-4 |
| 5 | 0.55 | 1-2 | | | | | | |
| 6 | 0.6 | 2 | | | | | | |
| 7 | 0.45 | 2 | 0.8 | 4 | 0.65 | 3 | 0.75 | 3-4 |
| 8 | 0.4 | 2 | 0.75 | 4 | 0.6 | 3 | 0.8 | 4 |
| 9 | 0.5 | 2 | 0.85 | 3 | 0.65 | 2-3 | 0.85 | 3-4 |
| 10 | 0.5 | 2 | 0.75 | 4-5 | 0.65 | 3-4 | 0.8 | 4-5 |
| 11 | 0.45 | 2 | 0.75 | 3-4 | 0.65 | 3 | 0.8 | 4 |
| 12 | 0.5 | 2 | 0.8 | 3-4 | 0.7 | 3 | 0.75 | 3-4 |
| 13 | 0.55 | 2-3 | 1.0 | 4 | 0.7 | 3 | 0.9 | 4 |
| 14 | 0.5 | 2 | 0.8 | 3-4 | 0.65 | 3 | 0.8 | 3-4 |
| 15 | 0.6 | 2-3 | 0.85 | 4 | 0.7 | 3-4 | 0.8 | 4-5 |
| 16 | 0.45 | 2 | 0.7 | 3 | 0.5 | 3 | 0.7 | 3 |
| 17 | 0.6 | 2 | See 10A and B | | — | — | — | — |
| 18 | — | — | 0.75 | 3 | 0.5 | 3 | 0.7 | 3-4 |

synthetic resin coatings are also surface sized with a binding agent dissolved or dispersed in water.

10. The photographic paper support of claim 1, wherein at least one of the paper and coating layers contains a dye, color pigment and/or optical brightener.

11. The photographic paper support of claim 1, wherein the base paper includes synthetic materials in fiber form.

12. The photographic paper support of claim 1, wherein the synthetic resin coating is selected from the group consisting essentially of a polyolefin or olefin copolymer.

13. The photographic paper support of claim 1, wherein the synthetic resin coating is positioned on at least one side of two superimposed layers.

14. The photographic paper support of claim 1, wherein the synthetic resin coating on at least one side of the support is of a copolyacrylate or copolymethacrylate and is hardened by electron beams.

15. The photographic paper support of claim 1, wherein at least one of the synthetic resin coatings contains pigment.

16. The photographic paper support of claim 15, wherein said pigment is a pigment mixture comprising predominantly a titanium dioxide and includes a small amount of at least one colored pigment and a small amount of an alkaline earth oxide or alkaline earth carbonate.

17. The photographic paper support of claim 1, wherein said water-repellant sizing agent is selected from the group consisting essentially of a dimeric alkylketene, a dimeric alkylarylketene an alkyl carboxylic acid anhydride, a metallic soap of an alkyl carboxyl acid or a mixture thereof and is present in the amount of about 0.2 to 2% by weight relative to the paper fiber content in the base paper, said cationic strengthening agent is a nitrogen. containing polymer and is present in an amount of at least about 1.5 times the water-repellant sizing agent, and said esterified polysaccharide is selected from the group consisting essentially of starch, cellulose, guaran, carubin, dextran or chitosan and is present in an amount of between about 0.1 to 10% by weight relative to said fiber content.

18. The photographic paper support of claim 17, wherein said esterified polysaccharide is water soluble and is present in an amount of about 0.1 to 5% by weight relative to said fiber content.

19. The photographic paper support of claim 17, wherein said esterified polysaccharide is substantially not water soluble and is present in an amount of about 0.5 to 10% by weight relative to said fiber content.

* * * * *

UNITED STATES PATENT AND TRADEMARK OFFICE

CERTIFICATE OF CORRECTION

PATENT NO. : 4,675,245

DATED : June 23, 1987

INVENTOR(S) : Walter P. M. Von Meer

It is certified that error appears in the above-identified patent and that said Letters Patent is hereby corrected as shown below:

In column 4, line 2, after "additives" insert --used--.
In column 9, line 19, after "is" insert --primarily--.

Signed and Sealed this

Tenth Day of November, 1987

*Attest:*

DONALD J. QUIGG

*Attesting Officer*

*Commissioner of Patents and Trademarks*